Oct. 31, 1967
S. H. FISTEDIS
3,349,524
REACTOR CONTAINMENT VESSEL
Filed Jan. 11, 1965
4 Sheets-Sheet 1
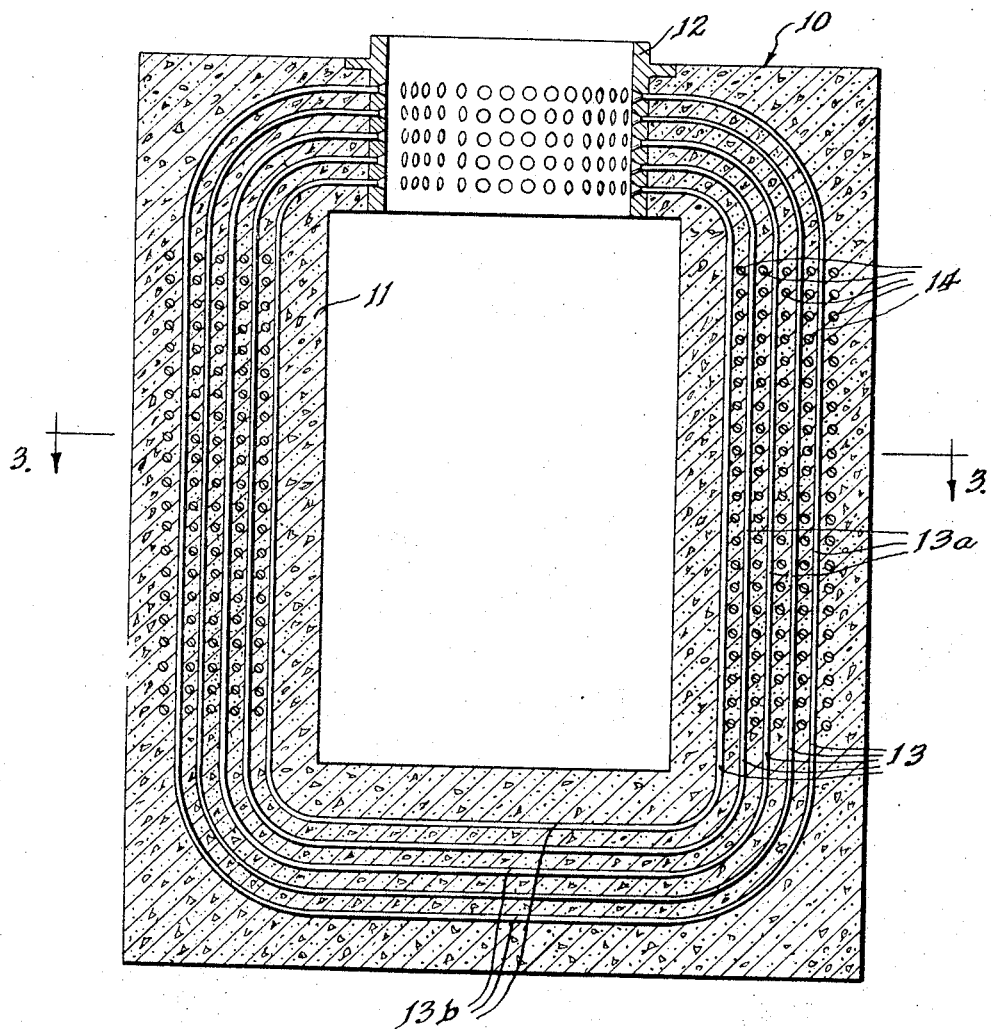
INVENTOR.
Stanley H. Fistedis
BY
Attorney Oct. 31, 1967 — S. H. FISTEDIS — 3,349,524
REACTOR CONTAINMENT VESSEL
Filed Jan. 11, 1965 — 4 Sheets-Sheet 2

INVENTOR.
Stanley H. Fistedis
BY
Roland A. Anderson
Attorney

INVENTOR.
Stanley H. Fistedis

United States Patent Office 3,349,524
Patented Oct. 31, 1967

3,349,524
REACTOR CONTAINMENT VESSEL
Stanley H. Fistedis, Park Ridge, Ill., assignor to the United States of America as represented by the United States Atomic Energy Commission
Filed Jan. 11, 1965, Ser. No. 424,867
1 Claim. (Cl. 52—20)

ABSTRACT OF THE DISCLOSURE

A containment vessel for a nuclear reactor having reinforcing cables and jackets enabling the cables to move with respect to the concrete of the vessel. Some of the cables are in the form of closed loops, and the others, in the form of open loops.

Contractual origin of the invention

The invention described herein was made in the course of, or under, a contract with the U.S. Atomic Energy Commission.

This invention relates to a containment vessel for a nuclear reactor. More specifically, the invention relates to the reinforcement of a containment vessel against the effects of an explosion therein.

In the past, reactor-containment vessels that would not crack under a nuclear incident or explosion had to be very thick and also to be of special construction that was expensive. Such construction might be composed of concentric steel blast cylinders separated by layers of compressible material. When containment vessels are constructed with conventional reinforcing rods or wire cables permitting reduction in thickness of the vessels, their usefulness is limited by the ability of the rods or cables to withstand explosive forces.

When a containment vessel is strengthened by a reinforcing member extending about the vessel, full use is made of the member provided any explosion acts uniformly about the interior of the vessel, because then the entire length of the reinforcing member receives the impact of the explosion. If, however, as is frequently the case with a nuclear incident, the explosive effects are localized at one side of the containment vessel, then only a section of the reinforcing member is utilized, with the result that the reinforcing member breaks more easily with an explosion of a given force.

I have invented an arrangement of reinforcing members for a containment vessel such that full use of the entire extent or length of the reinforcing members is obtained, even though the explosion is directed only at one region or side of the vessel. The strain resulting from the explosion is transmitted to the entire length of the reinforcing member, and so the member is less likely to break, even though the containment vessel itself cracks, and the reactor cavity preserves its general shape after the incident.

The aforementioned arrangement of reinforcing members involves mounting them in a containment vessel so that they are free to move lengthwise with respect to the vessel. Such lengthwise movement of a reinforcing member is made possible by a special jacket for the reinforcing member in the vessel, by lubricant between an unjacketed reinforcing member and its opening in the vessel, or by an unbinding fit between an unlubricated unjacketed reinforcing member and its opening in the vessel.

In the drawings:

FIG. 1 is a vertical sectional view of a reactor-containment vessel of the present invention;

Figure 9:
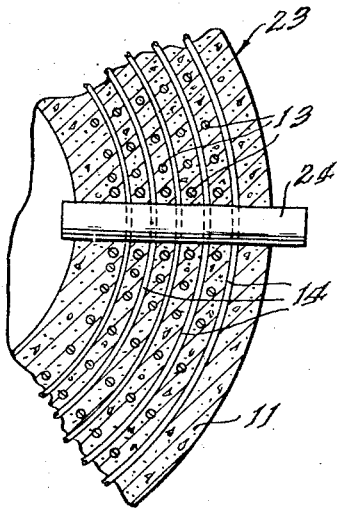
Figure 10:
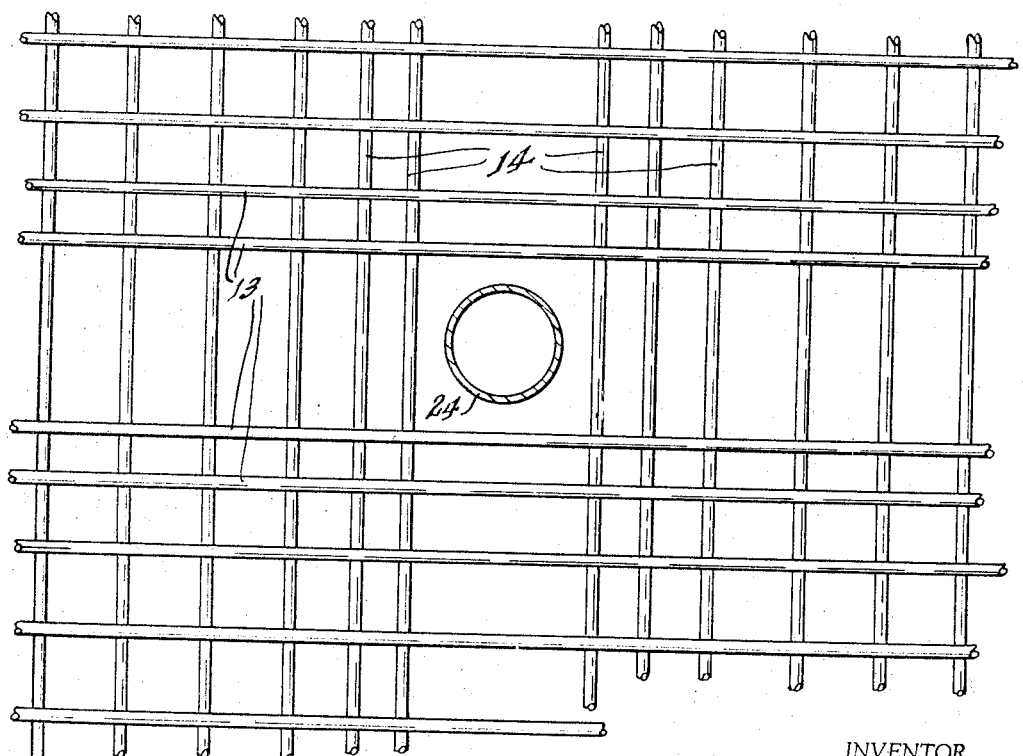
Figure 5:
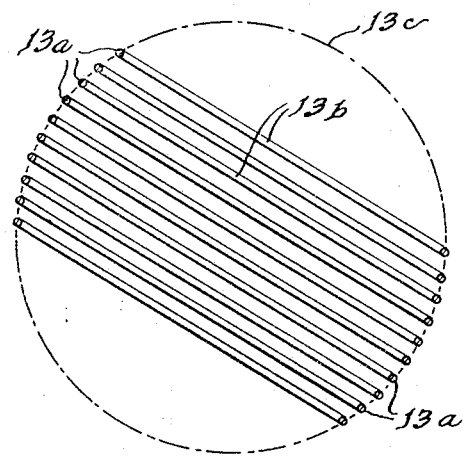
Figure 7:
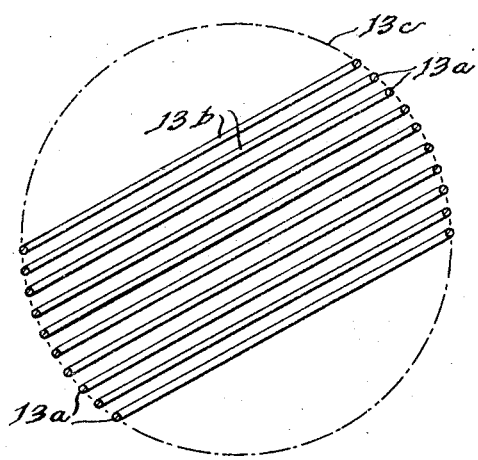
Figure 6:
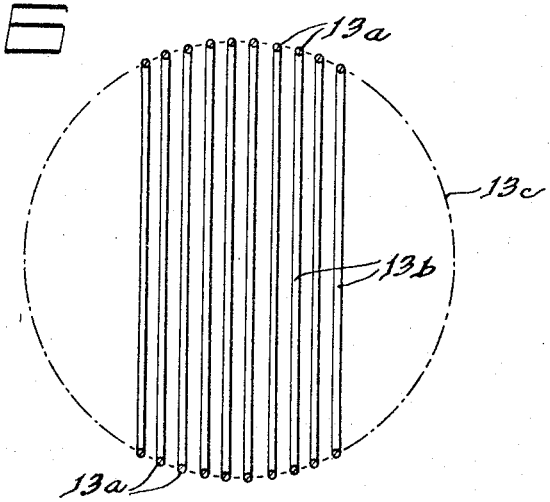
Figure 8:
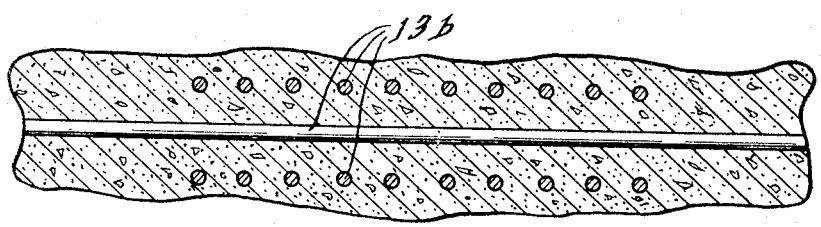

FIGS. 5, 6, and 7 are schematic plan views of portions of reinforcing assemblies in the base of the containment vessel;

FIG. 8 is a fragmentary vertical section of the base of the vessel;

FIG. 9 is a fragmentary horizontal sectional view of a modified containment vessel having an access pipe; and FIG. 10 is a fragmentary vertical sectional view, with parts omitted, of the modified containment vessel.

Figure 3:
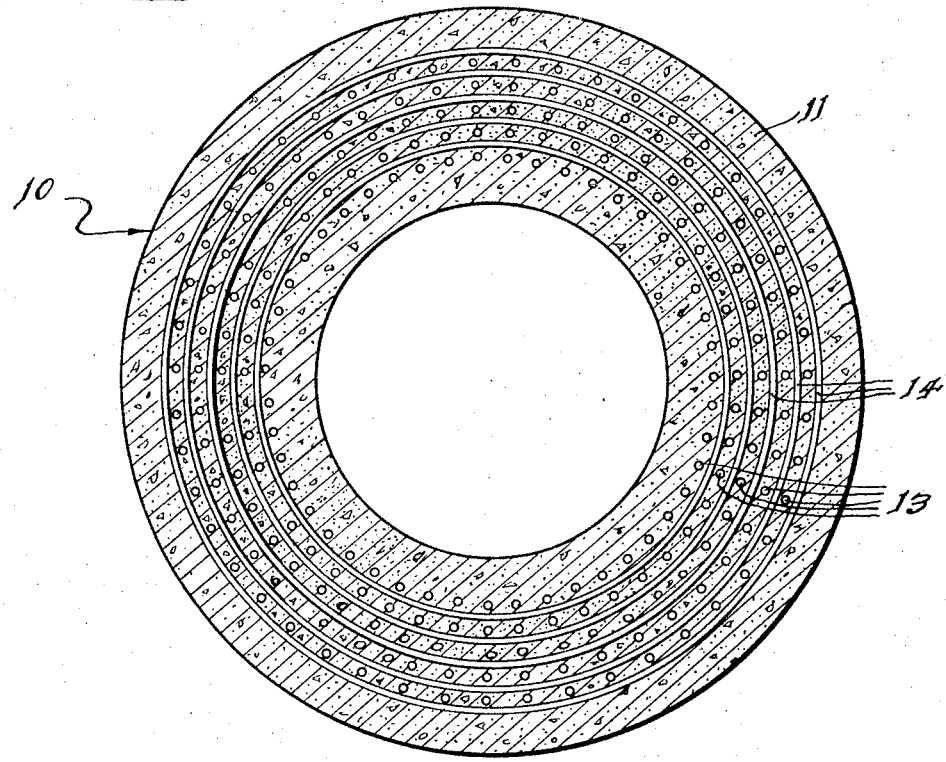
FIG. 3 is a horizontal sectional view taken on the line 3—3 of FIG. 1.

As shown in FIGS. 1 and 3, a reactor-containment vessel 10 comprises a mass 11 of concrete and a steel fitting 12 in the top having an opening through which access is obtained to the interior of the vessel adapted to contain a nuclear reactor (not shown). The vessel 10 has a plurality of reinforcing assemblies 13 each extending in a vertical plane from one side of the fitting 12, vertically downward through a side of the vessel 10, horizontally through the base of the vessel, and vertically upward through the opposite side of the vessel to the opposite side of the fitting 12. The vessel 10 also has a plurality of reinforcing assemblies 14 each formed as a closed circular loop lying in a horizontal plane and extending about the vessel through its sides.

The plurality of reinforcing assemblies 13 may be divided into several subpluralities. The assemblies 13 of an innermost subplurality are radially innermost in their vertical portions 13a at the sides of the vessel and lowermost at the top fitting 12 and uppermost in their horizontal portions 13b at the bottom of the vessel. The assemblies 13 of an outermost subplurality are radially outermost in their vertical portions at the sides of the vessel and uppermost at the top fitting 12 and lowermost in their horizontal portions at the bottom of the vessel. It is obvious how the various subpluralities of assemblies 13 between innermost and outermost will be arranged. Each assembly 13 of each subplurality lies in a vertical plane that is parallel to and spaced a small amount from the vertical planes of the adjacent assemblies 13 of the same subplurality.

In each subplurality horizontal portions 13b of the assemblies 13 in the base of the vessel 10 clear one another by being at three different levels spaced small amounts from one another, as seen in FIG. 8. The relative arrangement of the horizontal portions 13b at the three different levels is shown in FIGS. 5, 6, and 7. As shown in FIG. 5, the horizontal portions 13b of a first group of adjacent assemblies 13 numbering about one third of a given subplurality extend in parallel spaced relation to one another at an angle that in FIG. 5 appears as 30° below the horizontal when considered from left to right, the horizontal portion 13b of a central assembly of the first group being approximately coincident with the diameter of a circle 13c on which the vertical portions 13a of the assemblies 13 of the given subplurality lie. As shown in FIG. 6, the horizontal portions 13b of a second group of adjacent assemblies 13 numbering about one third of said given subplurality extend in parallel spaced relation to one another at an angle that in FIG. 6 appears as vertical, the horizontal portion 13b of a central one of the second group of assemblies being approximately coincident with the diameter of the circle 13c. As shown in FIG. 7, the horizontal portions 13b of a third group of adjacent assemblies 13 numbering about one third of said given subplurality extend in parallel spaced relation to one another at an angle that in FIG. 7 appears as 30° above the horizontal when considered from left to right, the horizontal portion 13b of a central one of the third group of assemblies being approximately coincident with a diameter of the circle 13c. The horizontal portions 13b of each group of adjacent assemblies 13 extend at about 60° to the horizontal portions 13b of the other groups of adjacent assemblies 13. The above described arrangement according to which the horizontal portions 13b of assemblies 13 are divided into three groups in each of which the horizontal portions are in parallel and spaced relation enables the horizontal portions 13b of an entire subplurality of assemblies 13 to be at only three different levels, rather than at a larger number of levels, one for each assembly 13 in a subplurality. Thus, the thickness of the base of the concrete mass 11 is kept from becoming excessive.

Figure 4:
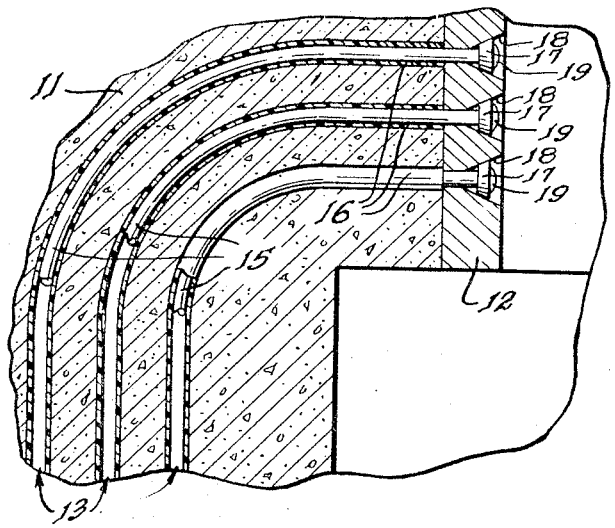
FIG. 4 is a fragmentary vertical sectional view of the containment vessel of FIG. 1.

As shown in FIG. 4, each reinforcing assembly 13 comprises a steel rod or cable 15 and a jacket 16 therefor formed of a plastic or metal. The jacket 16 is preferably of a plastic such as polyethylene, since forming the jacket of metal makes the assembly difficult to bend to the desired shape. Each end of the cable 15 extends through one side of the fitting 12 and is secured against radially outward movement with respect thereto by means of a conical collar 17 and a conical recess 18 in the fitting 12 against which the conical collar bears. The conical collar 17 fits the cable 15 and is retained thereon by an enlarged end 19 on the cable 15. The cable 15 fits the jacket 16, but may slide or move longitudinally with respect thereto. The jacket 16 may be longitudinally immovable with respect to the concrete mass 11, which may be poured over it during the forming of the vessel 10.

Figure 2:
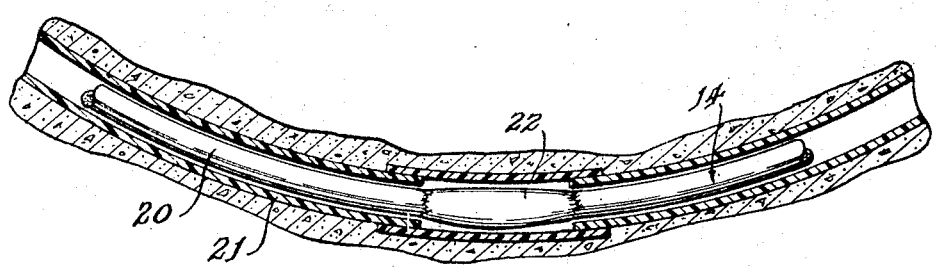
FIG. 2 is an enlarged fragmentary sectional view showing the arrangement of a reinforcing member in the containment vessel.

As shown in FIG. 2, each reinforcing assembly 14 comprises a steel rod or cable 20 and a jacket 21 therefor formed of metal or preferably of a plastic such as polyethylene. The ends of the part 20 are firmly attached to one another so that the part 20 comprises a closed loop. If the part 20 is a cable, its ends are joined as indicated at 22 by penetration and pressing together of the strands of the cable within one another and also either by welding or by other end attachments. The cable 20 loosely fits the jacket 21 and may slide or move longitudinally or circumferentially with respect thereto. FIG. 2 exaggerates the looseness of the fit between the jacket 21 and cable 20, for the sake of illustration. The jacket 21 may be longitudinally or circumferentially immovable with respect to the concrete mass 11, which may be poured over it during the forming of the vessel.

As shown in FIG. 1, the plurality of reinforcing assemblies 14 may be divided into several subpluralities, all the assemblies 14 of a given subplurality lying in the same horizontal plane which is vertically displaced from the horizontal planes of the other subpluralities of the assemblies 14. The assemblies 14 of each subplurality are concentric and of various diameters.

In a modified vessel 23 of FIGS. 9 and 10, access to the interior thereof is obtained by a pipe 24 mounted to extend through the side of the vessel. The assemblies 13 and the assemblies 14 have increased spacing at the pipe 24 so as to clear the same without being bent, and to compensate for the increased spacing, they are more closely spaced just beyond the pipe than at regions well away from the pipe.

It will be obvious from the foregoing description how the reinforcing assemblies 13 and 14 will control the vessel 10 in the event of a severe nuclear incident. In such an event, even though the explosion is localized at one region or side of the vessel 10, the full length or circumferential extent of each cable 15 or 20 is brought into play. This is due to the fact that cables 15 and 20 are not gripped so as to be immovable lengthwise with respect to the exploded portions of the vessel 10, but are enabled to slide in their jackets 16 and 21 and thus move lengthwise with respect to the vessel 10. Consequently, the effects of the explosion, even though localized in the reactor and vessel 10, are absorbed as strain energy and are distributed over the lengths or circumferential extents of the cables 15 and 20. Thus, for a given magnitude of explosion the reactor cavity is more likely to preserve its general shape after the explosion.

It is also understood that the invention is not to be limited by the details given herein but that it may be modified within the scope of the appended claim.

The embodiments of the invention in which an exclusive property or privilege is claimed are defined as follows:

A containment vessel comprising a mass of concrete having a hollow interior, open top, and closed bottom, a metallic fitting positioned in the open top of the concrete mass, a first plurality of metallic reinforcing cables extending from the metallic fitting through the sides and bottom of the concrete mass and back to the metallic fitting, each cable having one end anchored in the metallic fitting at one side and the other end anchored in the metallic fitting at the other side, a first plurality of jackets for the first plurality of cables, each cable of the first plurality having its own jacket directly engaging the concrete and separating the cable therefrom, each cable of the first plurality being capable of longitudinal movement with respect to its jacket and the concrete, each cable having vertical portions in the sides of the concrete mass and a horizontal portion in the base of the mass, said first plurality of cables being divided into groups of cables, the vertical portions of the cables of each group being disposed in a cylindrical arrangement, each said cylindrical arrangement of vertical portions being concentrically spaced, a second plurality of metallic reinforcing cables extending in the form of closed loops through the sides of the concrete mass about the hollow interior, and a second plurality of jackets for the cables of the second plurality, each cable of the second plurality having a jacket of the second plurality directly engaging the concrete and separating the cable therefrom, each cable of the second pluraltiy being capable of longtiudinal movement with respect to its jacket and the concrete each cable of the second plurality being circumferentially fixed between concentrically spaced cylindrical arrangements of vertical portions of said first plurality of cables and spaced therefrom.

References Cited

UNITED STATES PATENTS

| 871,655 | 11/1907 | Winslow | 52—20 |
| 2,751,660 | 6/1956 | Nakonz | 52—230 X |

FOREIGN PATENTS

| 1,382,525 | 11/1964 | France. |
| 936,198 | 9/1963 | Great Britain. |

OTHER REFERENCES

Architectural Record, August 1956, p. 211.

FRANK L. ABBOTT, *Primary Examiner.*

C. G. MUELLER, *Assistant Examiner.*